April 12, 1932.    E. H. SCHMIDT    1,853,836
SHOCK ABSORBING MECHANISM
Filed Jan. 26, 1928    2 Sheets-Sheet 1
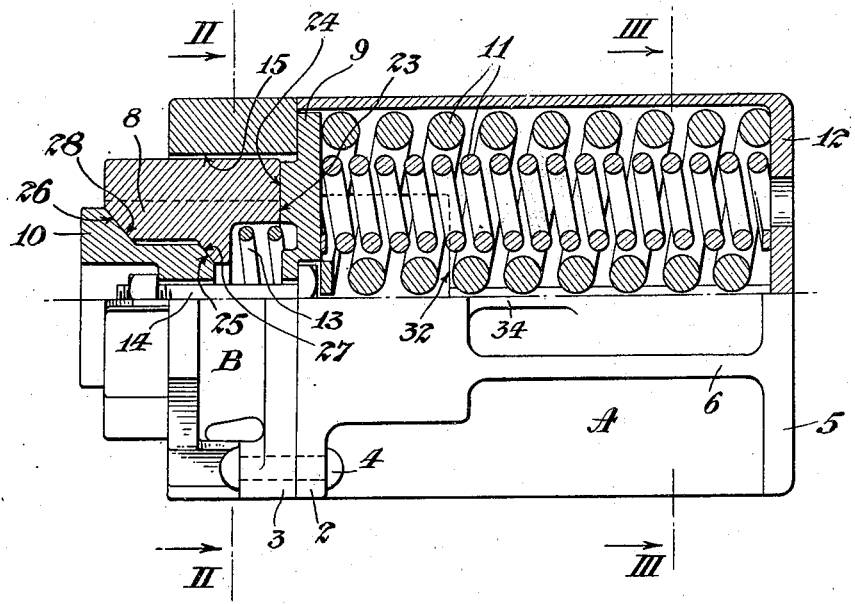
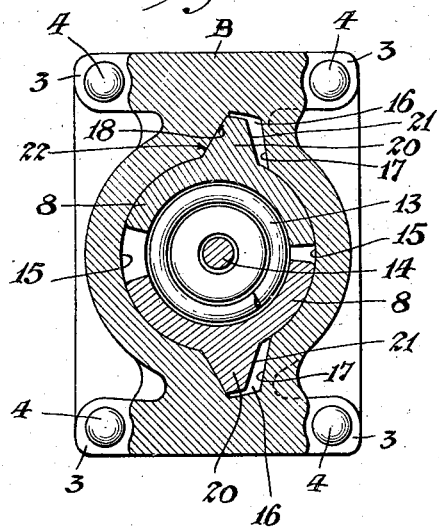 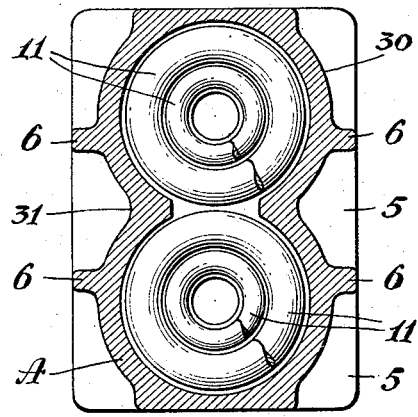
Inventor
Ernest H. Schmidt
By his Attorney
Clarence D. Kerr April 12, 1932. E. H. SCHMIDT 1,853,836
SHOCK ABSORBING MECHANISM
Filed Jan. 26, 1928  2 Sheets-Sheet 2
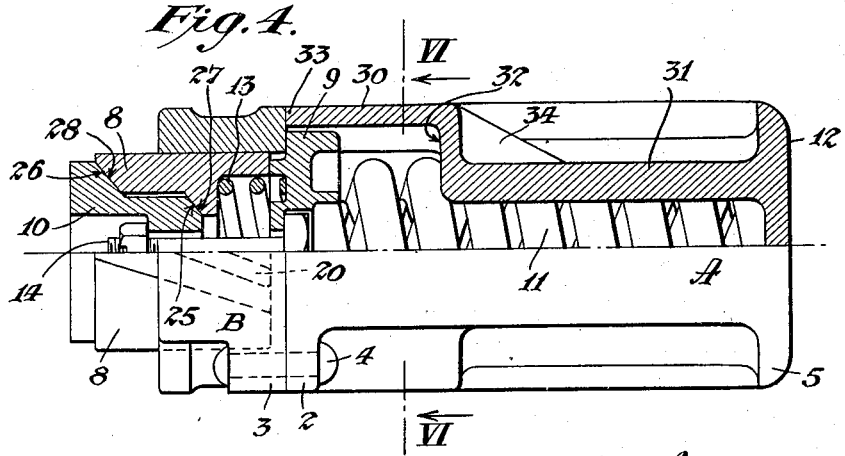
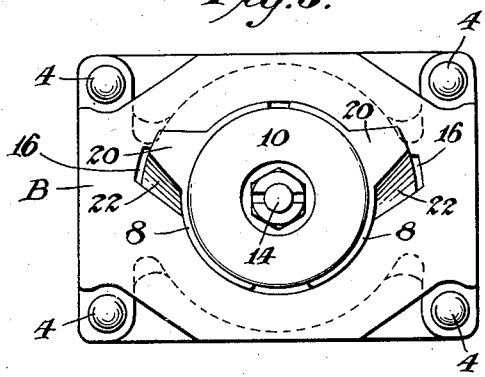
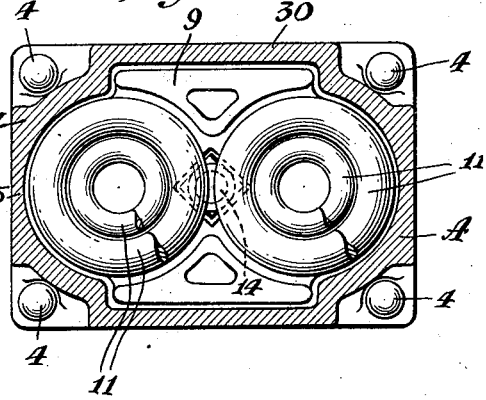
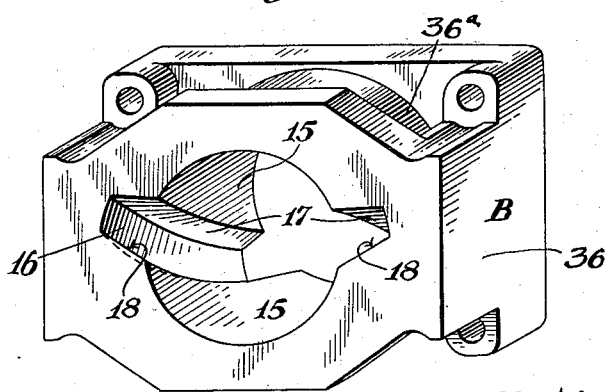
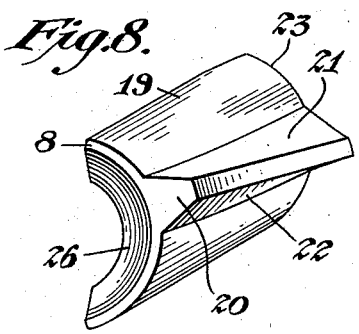
Inventor
Ernest H. Schmidt
By his Attorney
Clarence A. Kerr Patented Apr. 12, 1932

1,853,836

UNITED STATES PATENT OFFICE

ERNEST H. SCHMIDT, OF CLEVELAND HEIGHTS, OHIO, ASSIGNOR TO NATIONAL MALLEABLE AND STEEL CASTINGS COMPANY, OF CLEVELAND, OHIO, A CORPORATION OF OHIO

SHOCK ABSORBING MECHANISM

Application filed January 26, 1928. Serial No. 249,521.

My invention relates to friction shock absorbing mechanism, and particularly to draft gear of the type shown in my co-pending application, Serial No. 124,560, filed July 24, 1926, in which a friction barrel or case is engaged by a plurality of friction shoes and contains means for causing the shoes during compression or release to rotate or have an angular movement relative to the longitudinal axis of the shell, which thereby increases the frictional resistance and distributes the wear more uniformly within the friction casing.

The present application is a continuation in part of the said application, in so far as the invention relates to providing the walls of the friction casing with spiral friction grooves and to forming cooperating lugs on the shoes in such manner that a positive release of the shoes from the casing is effected. Important features of my invention are the location of the spiral friction faces near the center of the shoes; forming the friction case in a rugged beam section so as to transmit the load through the heavier sections of the spring case; and provision for a soft preliminary action of the gear, which is particularly desirable in passenger service, as will more fully appear. My invention also comprises various features which I shall hereinafter describe and claim.

In the accompanying drawings Fig. 1 is a plan, partly in section, of a friction draft gear embodying my invention; Fig. 2 is a section on lines II—II of Fig. 1; Fig. 3 is a section on lines III—III of Fig. 1; Fig. 4 is a side elevation, partly in section; Fig. 5 is a front elevation of the gear; Fig. 6 is a section on lines VI—VI of Fig. 4; Fig. 7 is a perspective of the friction shell; and Fig. 8 is a perspective of one of the friction shoes.

Referring to the drawings, A indicates a spring case or shell having at its forward end outwardly extending flanges 2 which are engaged by corresponding flanges 3 on the friction case B. The flanges 2 and 3 are held together by rivets 4. At its rear end the spring case A is provided with wings 5, suitably reinforced with the ribs 6, which extend longitudinally of the case and reinforce it against oversolid blows.

The friction case B contains friction shoes 8 interposed between the spring seat 9 and the friction wedge 10. The spring case carries one or more draft springs 11, which bear at one end against the spring seat and at the other end against the base 12 of the spring case. A small release spring 13 may also be interposed between the spring seat 9 and friction shoes 8. The parts are held in assembled relation by the retaining rod 14, which has a bearing on the wedge 10 and the spring seat 9. The inside face 15 of the friction case B may, if desired, be tapered inwardly toward the rear end, and is preferably provided with grooves 16, the side walls of which form compression and release spiral surfaces, indicated, respectively, as 17 and 18. The friction faces 19 of the shoes 8 have lugs 20 projecting therefrom, the side walls 21 and 22 of which incline toward each other, are spiral in form and are intended, respectively, for cooperation with the correspondingly shaped surfaces 17 and 18.

The arc-shaped surface 19 of a shoe 8 conforms to and has a frictional bearing against the inner surface 15 of the friction shell B, while the rear surface 23 of a shoe bears against the forward face of the spring seat 9, as is shown in Figs. 1 and 4. The face 24 may be of any desired shape. The shoes 8 are further provided with the wedging surfaces 25 and 26, which engage the correspondingly inclined wedging surfaces 27 and 28 of the friction wedge.

The operation of my improved gear is as follows: When the gear is being compressed, the friction wedge 10 is forced rearwardly with respect to the friction case B, and this in turn moves the shoes rearwardly against the action of the springs 11 and against the friction between the surfaces 19 of the shoes and the inner face 15 of the shell. As the shoes move rearwardly, the inclined and spiral compression surfaces 21 of the lugs 20 on the shoes cause the shoes to rotate in opposite directions, due to the guiding contact of such surfaces 21 with the walls 17 in the grooves 16 of the friction case. This causes an additional frictional engagement between the grooves 16 of the case and the faces 21 on the shoe lugs. The shoes thus have the friction surfaces 19, 21, 23, 25 and 26 which engage corresponding surfaces 15, 17, 24, 27 and 28 on the friction case, spring seat and wedge, the engagement of the case being both on the interior surface 15 and also on the surfaces 17 of the grooves 16. It will be seen that the rotation of the shoes in opposite directions serves to equalize the torsional force and eliminates any tendency of the gear to rotate as a unit. As the pressure abates, the release spring 13, if used, causes a slight outward movement of the wedge and shoes. The spring or springs 11 then moves the spring seat 9 and with it the shoes outwardly in a straight line until the surfaces 18 in the grooves 16 in the case engage surfaces 22 of the lugs 20. During their initial releasing movement the shoes do not rotate, for the reason that clearance is provided between the groove 16 and the lug 20 so as to prevent friction and thus provide an easy release. After this initial releasing action has taken place the frictional adhesion between the parts is broken and the spring 11 easily restores the parts to their normal position.

During release the lugs 20 cause the shoes 8 to rotate in reverse direction and thus to be restored to their initial positions. In the released position as shown the spiral groove surfaces 18 are in contact with the corresponding surfaces 22 of the lugs 20, and thus provide a clearance between the compression spiral groove surfaces 17 and the surfaces 21 on the shoes. This is for the purpose of providing an initial straight-in movement of the shoes, which is resisted by the spring capacity and to some extent by the friction surfaces 15 and 19, but not by the surfaces of the ribs and grooves, and thus gives a soft preliminary action to the gear. The clearance between one of the shoes and its guiding spiral may be made greater than that between the other shoe and its guiding spiral, with the result that one shoe may be caused to start in rotation ahead of the other both during compression and release, and while the other is still moving in a straight line. This permits the application of a graduated resistance during compression and a serial release.

The clearance provided between the lugs and the grooves in which they operate is also of further advantage in distributing the lines of wear, thus giving a somewhat smoother surface than would result from constant travel of the shoes back and forth along the same line.

An advantage in constructing the friction barrel B separate from the spring case A is that they may be of different material. Thus, for instance, the friction chamber may be made of wear resistant steel and the spring case of malleable iron.

In my improved device the oversolid blows are transmitted to the base 12 through the side walls 30 of the spring case. In order to provide the case with greater column strength to resist such blows, the side walls are carried in closely about the springs 11, as at 31. This structure provides a shoulder 32 against which the spring seat 9 may bear when the gear goes solid. Hence, oversolid blows are transmitted from the shoulder 32 to the base 12 instead of entirely from the forward end 33 of the spring case A. Inasmuch as the distance from the shoulder 32 to the base 12 is considerably less than the full length of the spring case A, oversolid blows will therefore be taken partially on the shorter and therefore stronger column represented by the section of the spring case A which lies between the shoulder 32 and the base 12. Further reinforcement is gained by the ribs 34. It will thus be seen that the spring case A is of extremely sturdy construction.

To prevent the side walls of the spring case A which are relatively thin because of clearance limitations in the region 35 as is shown in Fig. 6, from being damaged by oversolid blows, the friction case B has its side walls 36 built up so that the cylindrical walls 36$^a$ will merge into side walls 36 as is best shown in Fig. 7, so as to increase the strength of the friction case and form it into a rugged beam section which will not deflect and which will thus bridge over the thin side wall sections 35 of the spring case and carry the loads toward and transmit them through the heavier sections 37 of the spring case, as is best shown in Fig. 6.

Matter disclosed but not claimed herein is claimed in my co-pending application, Serial No. 124,560, filed July 24, 1926.

The terms and expressions which I have employed are used as terms of description and not of limitation, and I have no intention, in the use of such terms and expressions of excluding any mechanical equivalents of the features shown and described, or portions thereof, but recognize that various structural modifications are possible within the scope of the invention claimed.

What I claim is:

1. A shock absorbing mechanism comprising a friction casing having spiral grooves therein; friction shoes; a wedge maintaining the friction shoes in frictional engagement with said casing, said shoes having spiral ribs thereon cooperating with the spiral grooves in the casing to cause the shoes to rotate with respect to the wedge as they move longitudinally with it in compression of the mechanism, and a compression spring arranged to oppose the longitudinal movement of the shoes.

2. A shock absorbing mechanism comprising a friction casing having grooves therein; friction shoes; a wedge maintaining the friction shoes in frictional engagement with said casing, said shoes having ribs thereon cooperating with the grooves in the casing to cause the shoes to rotate with respect to the wedge as they move longitudinally with it, each of said ribs having a pair of faces one of which engages a spiral face of the groove in compression and the other of which engages the other of the faces of the grooves in release, and a compression spring arranged to oppose the longitudinal movement of the shoes during compression.

3. A shock absorbing mechanism comprising a friction casing having spiral grooves therein; friction shoes; the casing having circumferential friction faces engaged by corresponding arc-shaped faces on the shoes, each shoe having upon its arc-shaped face at a distance from the edges thereof a spiral rib cooperating with a corresponding one of the spiral grooves in the casing to rotate the shoes in compression of the mechanism; a wedge for maintaining the friction shoes in frictional engagement with the casing and for moving them longitudinally relative to it, and a compression spring arranged to oppose the longitudinal movement of the shoes.

4. A shock absorbing mechanism comprising a friction casing having spiral grooves therein; friction shoes having spiral ribs thereon, said ribs and grooves cooperating during buff and draft to cause the shoes and the casing to rotate relative to each other, the said grooves being substantially wider than the ribs to permit the shoes to move longitudinally before being caused to rotate with respect to the casing; a wedge for maintaining the friction shoes in frictional engagement with the casing and for moving them longitudinally relative to it, and a compression spring arranged to oppose the longitudinal movement of the shoes.

5. A shock absorbing mechanism comprising a friction casing having spiral grooves therein, friction shoes having spiral ribs thereon, said ribs and grooves cooperating to cause the shoes and casing under buff and draft to rotate relative to each other, said grooves having sufficient clearance over said ribs to permit the shoes to have an initial longitudinal movement in release to break the adhesion of the shoes from the casing; a wedge for maintaining the friction shoes in frictional engagement with the casing, and a compression spring arranged to oppose the longitudinal movement of the shoes during compression of the mechanism under buff and draft.

6. A shock absorbing mechanism comprising a friction casing having spiral grooves therein, friction shoes having spiral ribs thereon, said ribs and grooves cooperating to cause the shoes and casing under buff and draft to rotate relative to each other, said grooves having sufficient clearance over said ribs to permit the shoes to have an initial longitudinal movement in compression to give a soft preliminary action to the mechanism; a wedge for maintaining the friction shoes in frictional engagement with the casing, and a compression spring arranged to oppose the longitudinal movement of the shoes.

7. A shock absorbing mechanism comprising a friction casing having spiral grooves therein, friction shoes having spiral ribs thereon; cooperating faces on said ribs and in said grooves for rotating said shoes in compression of the mechanism; a wedge for developing friction between sets of the said faces during compression of the mechanism, there being clearance between other sets of faces on said ribs and in said grooves to assist in the positive release of the said frictional engagement as the said compression abates, and a compression spring arranged to oppose the longitudinal movement of the shoes during compression.

8. A friction shock absorbing mechanism comprising a friction casing; friction shoes, the casing having circumferential friction faces engaged by corresponding arc-shaped faces on the shoes, each shoe having adjacent its arc-shaped face at a distance from the edges thereof a spiral friction surface cooperating with a corresponding spiral friction surface on the casing for rotating said shoe in compression of the mechanism; a wedge for maintaining the friction shoes in frictional engagement with the casing and for moving them longitudinally relative to it, and a compression spring arranged to oppose the longitudinal movement of the shoes.

9. A friction shock absorbing mechanism comprising a friction casing; friction shoes; a wedge for maintaining the friction shoes in frictional engagement with said casing; spiral guiding means between the shoes and friction casing for rotating the shoes in opposite directions about the longitudinal axis of said friction casing during compression of the mechanism, said spiral guiding means comprising a spiral element positioned intermediate the longitudinal edges of each of the friction shoes, and a spring arranged to oppose the longitudinal movement of the shoes during compression.

10. In a shock absorber structure, a hollow friction member, friction shoe members having frictional engagement with the inner surface of the hollow friction member, a wedging member having telescopic relation to said friction shoe members and arranged under pressure of the load to force said friction shoe members radially outward to exert pressure against the surfaces of the hollow friction member with which they are in contact, and interengaging spiral lugs and grooves on the contiguous surfaces of said hollow friction member and said friction shoe members for imparting rotary movement to said shoe members under pressure of the load.

In testimony whereof, I have signed my name to this specification this 21st day of January, 1928.

ERNEST H. SCHMIDT.